United States Patent
Bauermeister et al.

(10) Patent No.: US 11,818,978 B2
(45) Date of Patent: Nov. 21, 2023

(54) PLANTING APPARATUS

(71) Applicant: Novelquip Forestry (Pty) Ltd, George (ZA)

(72) Inventors: Daniel Jacobus Bauermeister, Mosselbay (ZA); Lodewyk Schoeman, Mosselbay (ZA); Helgaard Petrus Steenkamp, George (ZA)

(73) Assignee: NOVELQUIP FORESTRY (PTY) LTD, George (ZA)

( * ) Notice: Subject to any disclaimer, the term of this patent is extended or adjusted under 35 U.S.C. 154(b) by 0 days.

(21) Appl. No.: 17/918,202

(22) PCT Filed: May 19, 2021

(86) PCT No.: PCT/ZA2021/050033
§ 371 (c)(1),
(2) Date: Oct. 11, 2022

(87) PCT Pub. No.: WO2021/237252
PCT Pub. Date: Nov. 25, 2021

(65) Prior Publication Data
US 2023/0189694 A1 Jun. 22, 2023

(30) Foreign Application Priority Data
May 22, 2020 (ZA) .................. 2020/03018

(51) Int. Cl.
*A01C 7/00* (2006.01)
*A01C 7/20* (2006.01)

(52) U.S. Cl.
CPC .............. *A01C 7/002* (2013.01); *A01C 7/208* (2013.01)

(58) Field of Classification Search
CPC .. A01C 7/208; A01C 7/20; A01C 7/00; A01C 7/002
See application file for complete search history.

(56) References Cited

U.S. PATENT DOCUMENTS

| 1,287,759 A | 12/1918 | Russell |
| 1,443,382 A | 1/1923 | Rapier |
| 1,803,172 A | 4/1931 | Clayton |
| 1,889,112 A | 11/1932 | Shoemaker |

(Continued)

FOREIGN PATENT DOCUMENTS

| CN | 206010547 | 3/2017 |
| DE | 932478 | 9/1955 |

(Continued)

OTHER PUBLICATIONS

International Search Report and Written Opinion dated Aug. 31, 2021 in PCT Patent Application No. PCT/ZA2021/050033.

*Primary Examiner* — Christopher J. Novosad
(74) *Attorney, Agent, or Firm* — Billion & Armitage

(57) ABSTRACT

Planting apparatus includes: (i) a housing that defines: a primary guide; and first and second opposed branch guides extending laterally from the primary guide; (ii) a first runner slidably secured to, and movable along the primary guide; (iii) a second runner securable to, and movable along a first branch guide; and (iv) a third runner securable to, and movable along a second branch guide. The first, second and third runners are configured such that: the second runner is receivable from the first branch guide on to the first runner; and the third runner is receivable from the second branch guide on to the first runner. Actuators move: (i) the second runner along the first branch guide and on to the first runner; (ii) the third runner along the second branch guide and on to the first runner; and (iii) the first runner, together with either of the second or third runners received thereon, along the primary guide.

15 Claims, 9 Drawing Sheets

(56) References Cited

U.S. PATENT DOCUMENTS

| | | |
|---|---|---|
| 2,943,579 A | 7/1960 | Geddes |
| 3,181,274 A | 5/1965 | Izenour |
| 3,253,552 A | 5/1966 | Stein |
| 3,356,039 A | 12/1967 | Fonden et al. |
| 3,708,916 A | 1/1973 | Karp, Jr. et al. |
| 3,748,793 A | 7/1973 | Tompkins et al. |
| 3,843,995 A | 10/1974 | Merrill |
| 3,879,799 A | 4/1975 | Williams |
| 3,944,180 A | 3/1976 | Rogers |
| 3,984,930 A | 10/1976 | Booland |
| 4,141,106 A | 2/1979 | Dixon |
| 4,159,556 A | 7/1979 | Dickenson |
| 4,336,757 A | 6/1982 | Toder |
| 4,459,924 A | 7/1984 | Hassan et al. |
| 4,991,257 A | 2/1991 | Eutebach |
| 5,016,318 A | 5/1991 | Harris |
| 5,063,636 A | 11/1991 | Dickson |
| 5,295,281 A | 3/1994 | Kordes |
| 5,406,676 A | 4/1995 | Williams |
| 6,315,138 B1 | 11/2001 | Dyson |
| 6,374,456 B1 | 4/2002 | Fort et al. |
| 10,023,384 B2 | 7/2018 | Benedict |
| 2008/0314281 A1 | 12/2008 | Carroll |
| 2010/0038041 A1 | 2/2010 | Liao |
| 2011/0006026 A1 | 1/2011 | Lee et al. |

FOREIGN PATENT DOCUMENTS

| | | |
|---|---|---|
| EP | 0437029 | 7/1991 |
| EP | 2096246 | 9/2009 |
| JP | S6013181 | 1/1985 |
| JP | H01193136 | 8/1989 |
| WO | 8501718 | 4/1985 |
| WO | 8909320 | 10/1989 |
| WO | 9722431 | 6/1997 |
| WO | 2013190176 | 12/2013 |
| WO | 2016171111 | 10/2016 |

PLANTING APPARATUS

BACKGROUND

The present invention relates to planting apparatus. More specifically, the present invention relates to a seedling planting apparatus that interchangeably uses: a subsoiling head for preparing soil in pits; and a planting head for planting seedlings in the pits.

Various machinery exists that include: a working part (e.g. a drill); and a selection of tools (either stored within a magazine or on a carousel) that are interchangeably secured to the working party. Examples of such tools include: CN206010547 "Tool magazine system for digit control machine tool", JPH01193136 "Tool magazine" and WO9722431 "Flame cutting machine with tool fixing device". A drawback of these machines with interchangeable tools is that they are not particularly suited to swap heavy tools, which should preferably be interchanged without breaking their secure connection to the machine. The present invention aims to interchange subsoiling and planting heads without the heads losing their secure connection to the planting apparatus.

Furthermore, planting apparatus that swap between subsoiling and planting heads are known. For instance, Pro-Plant1 apparatus manufactured by Novelquip Forestry (Pty) Ltd includes opposing planter and a subsoiling heads secured to axial ends of a link, which link is hingedly secured at its centre to a boom. To swap between the planter and subsoiling heads, the link rotates 180 degrees about its hinged connection. A drawback of this arrangement is that it requires approximately 2 meter swing clearance to swap between the planter and subsoiling heads. It is an object of the present invention to provide planting apparatus that requires less lateral clearance to swap between the two heads, as consequently to enable more dense planting of seedlings.

Instead of using link rotation to swap between the planting and subsoiling heads, the present invention uses a T-shaped guide including a central primary guide section and a pair of opposing branch guide sections at an axial end of the primary guide section. The planting and subsoiling heads may be stored along the branch guide sections, and a selected head may travel along the primary guide section towards an extended position for boring pits/planting seedlings.

T-shaped guides along which runners travel are also known. For instance, DE932478 "Gleitbahn mit daran gleitenden haken, insbesondere fuer schlachthauszwecke", EP0437029 "Operable wall deployment and storage system", EP2096246 "Device comprising a rail system, at least one carrier and a transport mechanism for use in such a device", JPS6013181 "Hanging device of moving room partition wall", U.S. Ser. No. 10/023,384 "Overhead guide track systems for automated material handling and storage and parking facilities", U.S. Pat. No. 1,287,759 "Apparatus for transferring baggage", U.S. Pat. No. 1,443,382 "Device for switching universal cranes", U.S. Pat. No. 1,803,172 "Tube conveyor", U.S. Pat. No. 1,889,112 "Hanger", US2008314281 "Multi-directional dolly transfer system", US2010038041 "Suspension pulley structure for movable partitions", US2011006026 "Intersection navigation system", U.S. Pat. No. 2,943,579 "Transit grid", U.S. Pat. No. 3,181,274 "Versatile display apparatus", U.S. Pat. No. 3,253,552 "Trolley systems", U.S. Pat. No. 3,356,039 "Device for switch in track system", U.S. Pat. No. 3,708,916 "Movable wall panel systems", U.S. Pat. No. 3,748,793 "Intersection construction for movable wall panel system", U.S. Pat. No. 3,843,995 "Trolley for movable wall panels", U.S. Pat. No. 3,879,799 "Multidirectional suspension system for operable partitions", U.S. Pat. No. 3,944,180 "Supporting apparatus for intravenous containers or the like", U.S. Pat. No. 3,984,930 "Apparatus for showing materials and combinations of materials", U.S. Pat. No. 4,141,106 "Multi-directional canted wheel carrier for operable walls", U.S. Pat. No. 4,159,556 "Suspension system primarily designed for use with operable walls and partitions", U.S. Pat. No. 4,336,757 "Track switch", U.S. Pat. No. 4,991,257 "Sliding door apparatus", U.S. Pat. No. 5,016,318 "Multi-directional radial wheel trolley and track for operable walls", U.S. Pat. No. 5,063,636 "Track system for operable wall", U.S. Pat. No. 5,295,281 "Guiding system having a trolley for moving suspended door panels and the trolley", U.S. Pat. No. 5,406,676 "Multi-directional carrier system for operable partitions", U.S. Pat. No. 6,315,138 "Multidirectional, switchless overhead support system", U.S. Pat. No. 6,374,456 "Linear motion trolley and track systems for operable walls", WO8501718 "Transport device having rectangular transport bodies" and WO8909320 "Travelling apparatus for suspended panel" describe a primary guide section with opposed branch guide sections extending orthogonally from the primary guide section, wherein a runner may travel along the primary guide section and into a branch guide section.

However, the guides described in the prior art:
do not include drive means for moving the runners along the guide; and
include runners that engage directly with, and move along the primary guide section and opposed branch guide sections.

The present invention aims to provide a planting apparatus:
wherein movement of runners along the primary guide section and along each of the opposed branch guide sections is controlled by drive means; and
including first and second runners, wherein: the second runner is movable along a branch guide section; the second runner being receivable on the first runner, and the first runner (with the second runner received thereon) is movable along the primary guide section.

SUMMARY OF THE INVENTION

According to a preferred embodiment of a first aspect of the invention, there is provided planting apparatus that includes:
a housing that defines:
a primary guide; and
first and second opposed branch guides extending laterally from the primary guide;
a first runner slidably secured to, and movable along the primary guide;
a second runner securable to, and movable along a first branch guide;
a third runner securable to, and movable along a second branch guide;
the first, second and third runners being configured such that: the second runner is receivable from the first branch guide on to the first runner; and the third runner is receivable from the second branch guide on to the first runner; and
drive means for moving:
the second runner along the first branch guide and on to the first runner;

the third runner along the second branch guide and on to the first runner; and the first runner, together with either of the second or third runners received thereon, along the primary guide.

Typically:

each of the primary guide, the first branch guide and the second branch guide is linear; and the opposing first and second branch guides: are aligned with each other; and extend orthogonally from the primary guide.

Generally, the first runner defines a bridging guide portion that bridges the first and second branch guides when the first runner is in a retracted position and disposed on the primary guide, between the first and second branch guides.

Preferably, a subsoiling head is secured to the second runner, and a planting head is secured to the third runner.

Typically, the drive means comprises:

a first actuator for moving the first runner, together with either of the second or third runners received thereon, along the primary guide; and a second actuator for moving:

the second runner along the first branch guide and on to the first runner; and the third runner along the second branch guide and on to the first runner.

Generally, the first actuator and the second actuator extend and retract along parallel, spaced apart planes.

Preferably, the primary guide on the one hand and the first and second branch guides on the other hand extend along parallel, spaced apart planes.

Typically:

the first actuator is connected to the housing and extends to the first runner to move the first runner along the primary guide; and the second actuator is connected to the housing and extends towards the second and third runners to move the second and third runners:

along the first and second branch guides, respectively and on to the first runner; and from the first runner along the first and second branch guides, respectively.

Generally, the planting apparatus further includes locking means for:

preventing movement of the second runner along the first branch guide when: the third runner is received on the first runner; and the first runner is spaced along the primary guide from the retracted position; and preventing movement of the third runner along the second branch guide when: the second runner is received on the first runner; and the first runner is spaced along the primary guide from the retracted position.

Preferably:

the locking means comprises a link plate that defines recesses for receiving the second and third runners therein; and the second actuator is connected at: a first axial end of the second actuator to the housing; and a second axial end of the actuator to the link plate.

Typically, when the first runner is at an axial end of the primary guide, distal the first and second branch guides, either the subsoiling head or the planting head carried on the first runner protrudes from the housing.

Generally, the planting apparatus further includes an elevator comprising:

a track;

a carriage that is slidably secured to the track; and a third actuator for moving the carriage along the track, wherein:

the housing is secured to the carriage; and the track is securable to a vehicle, in use, to raise and lower the housing relative to the vehicle.

Alternatively, the housing may be secured to the track, and the carriage may be securable to a vehicle, Preferably, the planting apparatus further includes a fourth actuator that is disposed between vehicle and the elevator, in use, to move the elevator laterally relative to the vehicle.

Typically, the planting apparatus further includes:

a first intermediate body disposed between the subsoiling head and the second runner, thereby further to extend the subsoiling head from the second runner; and a second intermediate body disposed between the planting head and the third runner, thereby further to extend the planting head from the third runner.

BRIEF DESCRIPTION OF THE DRAWINGS

The invention will now be described in more detail, by way of examples only, with reference to the accompanying drawing in which.

DESCRIPTION OF THE INVENTION

Figure 1:
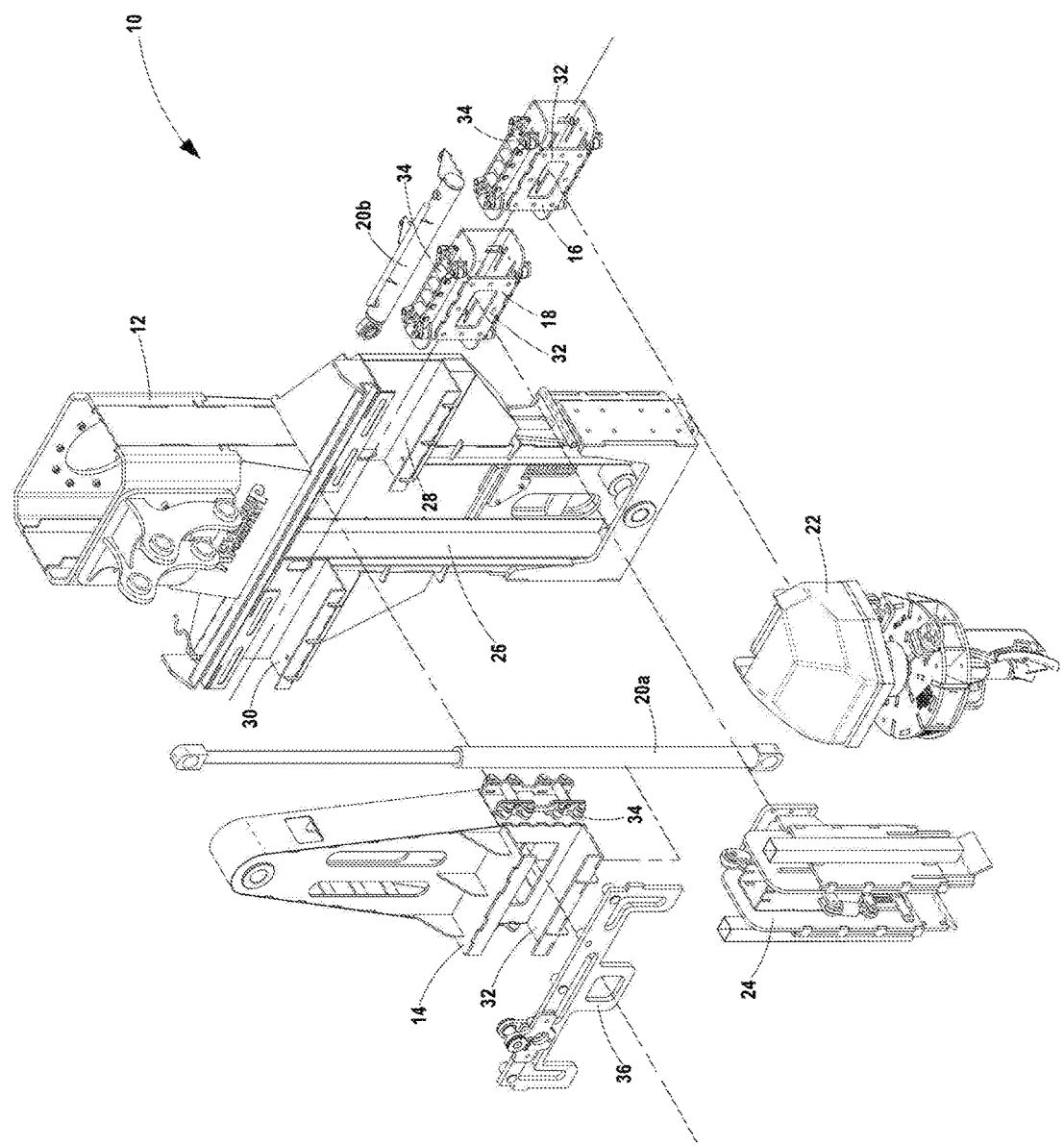
FIG. 1 is a first perspective exploded view of planting apparatus according to a preferred embodiment of the invention.

With reference to FIGS. 1 to 6, a planting apparatus 10 according to a preferred embodiment of the invention includes a housing 12, first second and third runners 14, 16 and 18, drive means 20, a subsoiling head 22 and a planting head 24.

The planting apparatus 10 is used to: prepare soil for planting using the subsoiling head 22; and plant seedlings within the prepared soil using the planting head 24.

The housing 12 defines:

a primary guide 26 in the form of a linear rail that is generally U-shaped in axial cross-section and defines a constriction along the length of its radial opening;

a first branch guide 28 in the form of a linear rail that is generally U-shaped in axial cross-section and defines a constriction along the length of its radial opening; and a second branch guide 30 in the form of a linear rail that is generally U-shaped in axial cross-section and defines a constriction along the length of its radial opening.

The first and second branch guides 28 and 30:
oppose each other;
are axially aligned with each other; and
extend laterally, more specifically, orthogonally from the primary guide 26.

The primary guide 26 and the branch guides 28 and 30 form a T-shape.

Figure 2:
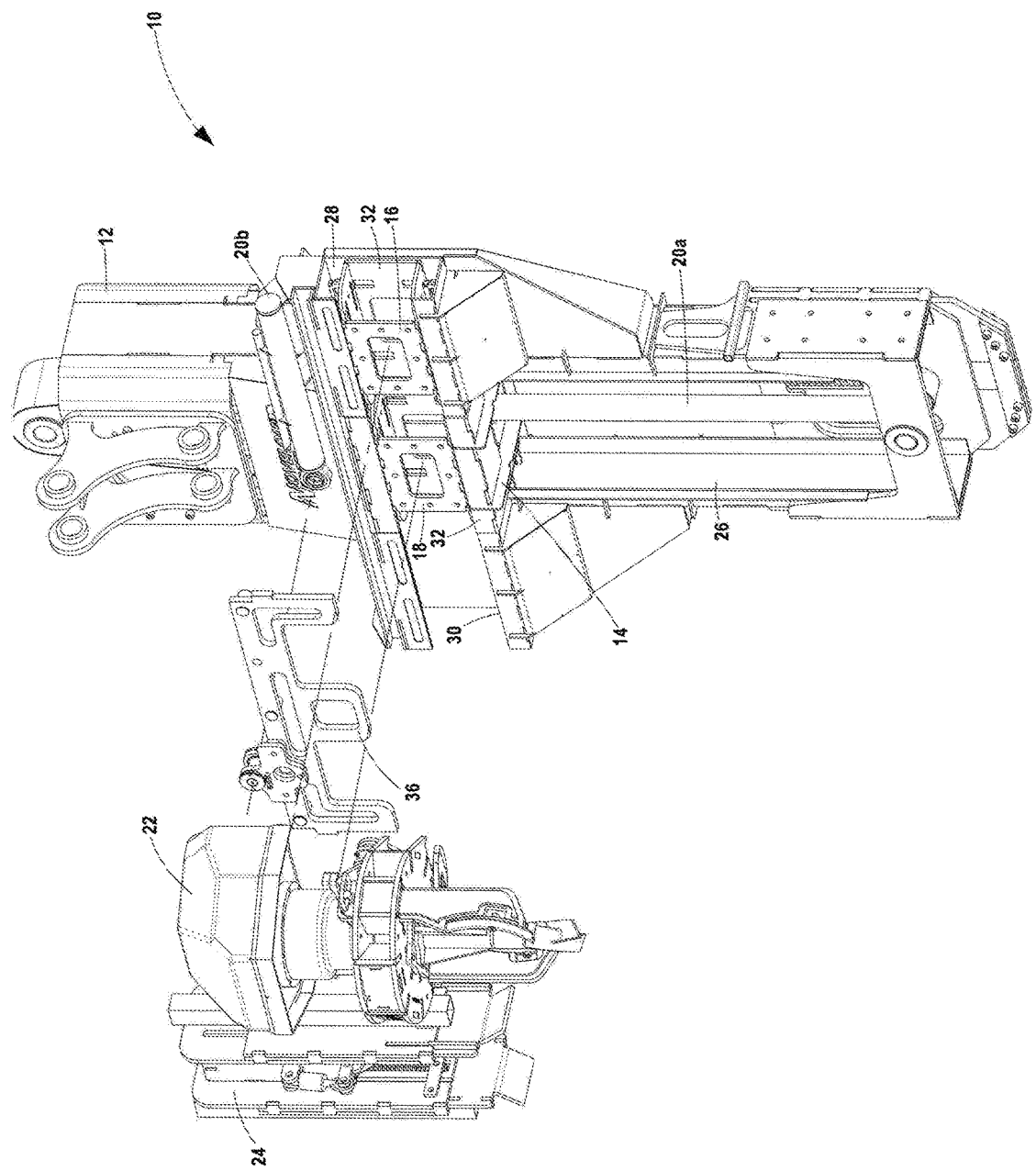
FIG. 2 is a second perspective exploded view of the planting apparatus in FIG. 1.

As can be seen in FIG. 2, the first and second branch guides 28 and 30 extend along a plane that is parallel to, but spaced from the plane along which the primary guide 26 extends. Put another way, having regard to the front view shown in FIG. 4, the primary guide 26 extends along a plane that is further to the rear than the plane along which the first and second branch guides 28 and 30 extends.

Figure 7:
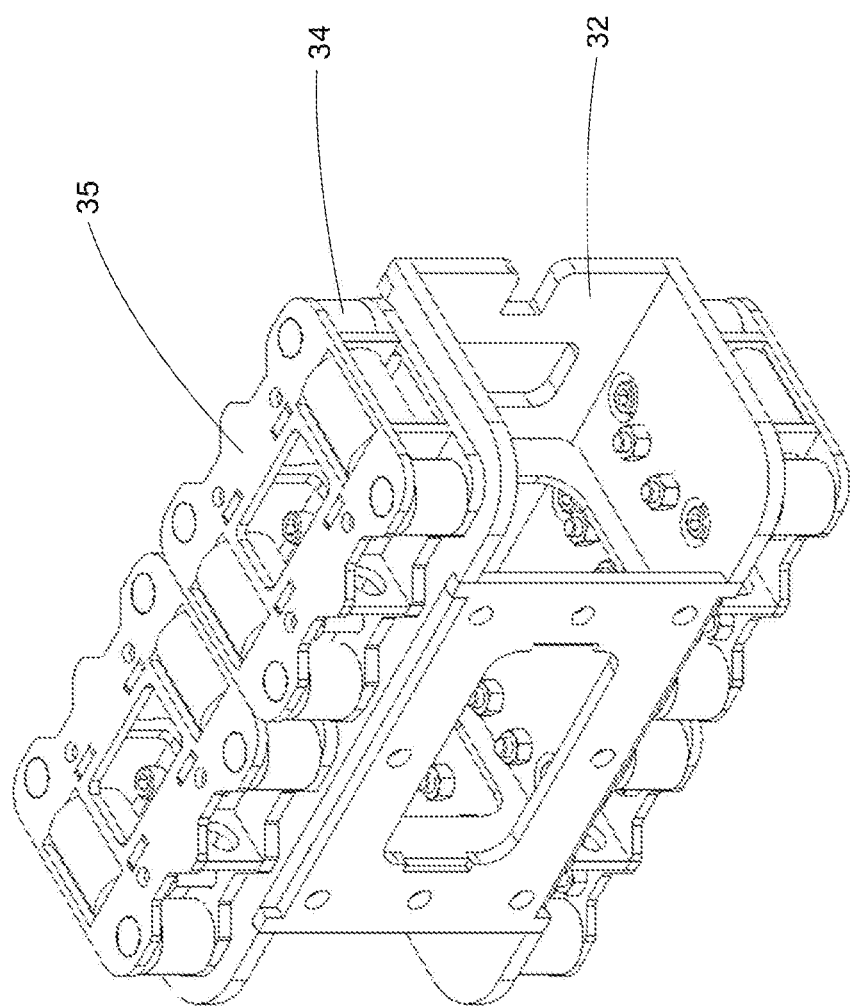
FIG. 7 is a perspective view of a runner that forms part of the planting apparatus in FIG. 1.

Each runner 14, 16 and 18 comprises a body 32 and a series of wheels 34 rotatably secured to the body 32. To facilitate replacement of the wheels 34, the wheels 34 are typically rotatably secured to a mounting 35 that is, in turn, releasably secured to the body 32, as shown in FIG. 7. The first runner 14 is sized and shaped to fit within the U-shaped rail of the primary guide 26, but is oversized relative to the constricted radial opening defined by the primary guide 26, thereby to capture the first runner 14 within the first guide 26. Accordingly, the first runner 14 is slidably secured to the primary guide 26. The second runner 16 is sized and shaped to fit within the U-shaped rail of the first branch guide 28, but is oversized relative to the constricted radial opening defined by the first branch guide 28, thereby to capture the second runner 16 within the first branch guide 28, when disposed therein. Accordingly, the second runner 16 is slidably securable to the first branch guide 28. Similarly, the third runner 18 is sized and shaped to fit within the U-shaped rail of the second branch guide 30, but is oversized relative to the constricted radial opening defined by the second branch guide 30, thereby to capture the third runner 18 within the second branch guide 30, when disposed therein. Accordingly, the third runner 18 is slidably securable to the second branch guide 30.

The first, second and third runners 14, 16 and 18 are configured such that:
the second runner 16 is receivable from the first branch guide 28 on to the first runner 14; and
the third runner 18 is receivable from the second branch guide 30 on to the first runner 14.

More specifically, the first runner 14 defines a bridging guide portion on its operative support surface. The bridging guide portion is in the form of a linear rail that is generally U-shaped in axial cross-section, defining open axial ends and a constriction along the length of its radial opening. In essence, the bridging guide portion of the first runner 14 is shaped to correspond with the open axial ends of the first and second branch guides 28 and 30, thereby to bridge the first and second branch guides 28 and 30 when the first runner 14 is disposed:
on the primary guide 26,
at an axial end of the primary guide 26 proximal the first and second branch guides 28 and 30, and
between the first and second branch guides 28 and 30.
(herein referred to as the retracted condition)

In other words, when the first runner 14 is disposed between the first and second branch guides 28 and 30:
the first branch guide 28;
the bridging guide portion on the first runner 14; and
the second branch guide 30,
provide a continuous guide within which second or third runners 16 or 18 may be secured, and along which the second or third runners 16 or 18 are slidably movable without breaking their secure connection to the housing 12.

The drive means 20 comprises:
a first actuator 20a, in the form of a hydraulic actuator that: is connected to the housing 12 at a first end; and extends towards and is connected to the first runner 14. In use, the first actuator 20a slidably moves the first runner 14 along the primary guide 26 between: (i) the retracted position (i.e. where the first runner 14 is disposed between the first and second branch guides 28 and 30); and (ii) an extended position, in which the first runner 14 is at an axial end of the primary guide 26, distal the first and second branch guides 28 and 30. It will be appreciated that when the first runner 14 supports a second runner 16 or a third runner 18 thereon, the first actuator 20a moves the first runner together with the supported second or third runner 16 or 18 along the primary guide 26; and
a second actuator 20b, in the form of a hydraulic actuator that: is connected to the housing 12 at a first end; and extends towards the second and third runners 16 and 18. In use, the second actuator 20b slidably moves:
the second runner 16 along the first branch guide 28 and on to the first runner 14 (and back again); and
the third runner 18 along the second branch guide 30 and on to the first runner 14 (and back again).

As will be appreciated from FIG. 2, the first and second actuators 20a and 20b extend and retract along parallel, spaced apart planes. Put another way, having regard to the front view shown in FIG. 4, the first actuator 20a extends and retracts along a plane that is further to the rear than the plane along which the second actuator 20b extends and retracts.

Figure 3:
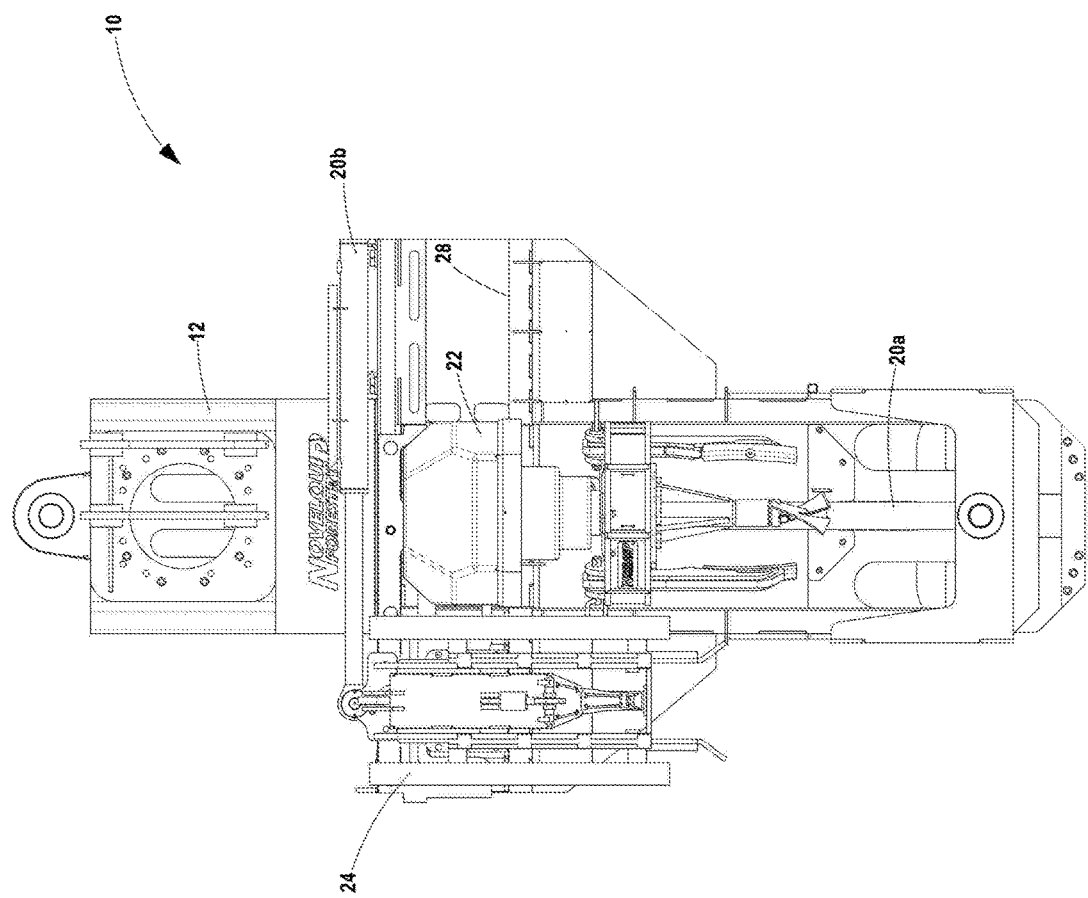
FIG. 3 is a front view of the planting apparatus in FIG. 1, with a first runner in a retracted position and a subsoiling head supported thereon.
Figure 5:
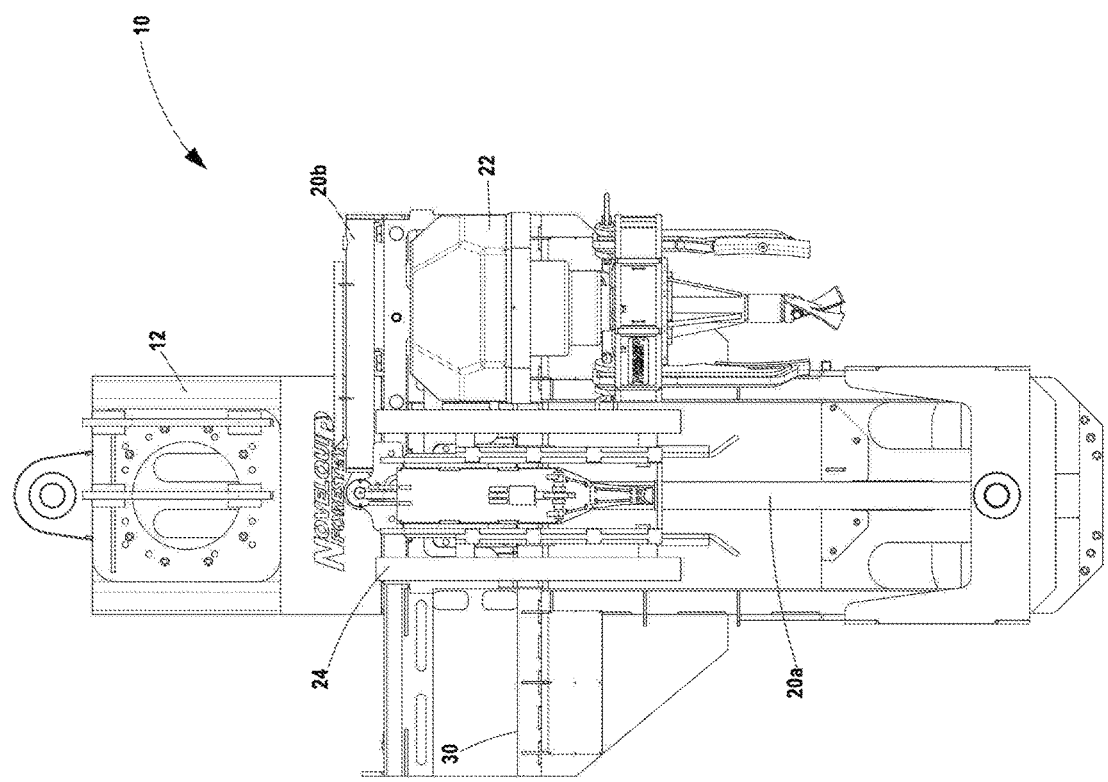
FIG. 5 is a front view of the planting apparatus in FIG. 1, with a first runner in a retracted position and a planting head supported thereon.

With reference to FIGS. 3 and 5, when the second and third runners 16 and 18 are disposed within the branch guides 28 and 30 or on the first runner 14 (when in the retracted position), the second actuator 20b is securable to the second and third runners 16 and 18/their corresponding subsoiling head 22 or planting head 24 via a link 36 in the form of a plate that defines a pair of recesses for receiving the second and third runners 16 and 18/the subsoiling and planting heads 22 and 24 therein. Optionally, the primary guide 26 may include formations (e.g. a lip) that retains the second runner 16 or the third runner 18 on the first runner 14 when the second or third runner 16 or 18 is not received within the recesses defined by the link 36.

The subsoiling head 22 may be a subsoiling head known in the art, and is secured to the second runner 16. When the second runner 16 is captured within the first branch guide 28, the subsoiling head 22 stands proud of the U-shaped channel defined by the first branch guide 28.

The planting head 24 may be a planting head known in the art, and is secured to the third runner 18. When the third runner 18 is captured within the second branch guide 30, the planting head 24 stands proud of the U-shaped channel defined by the second branch guide 30.

Figure 4:
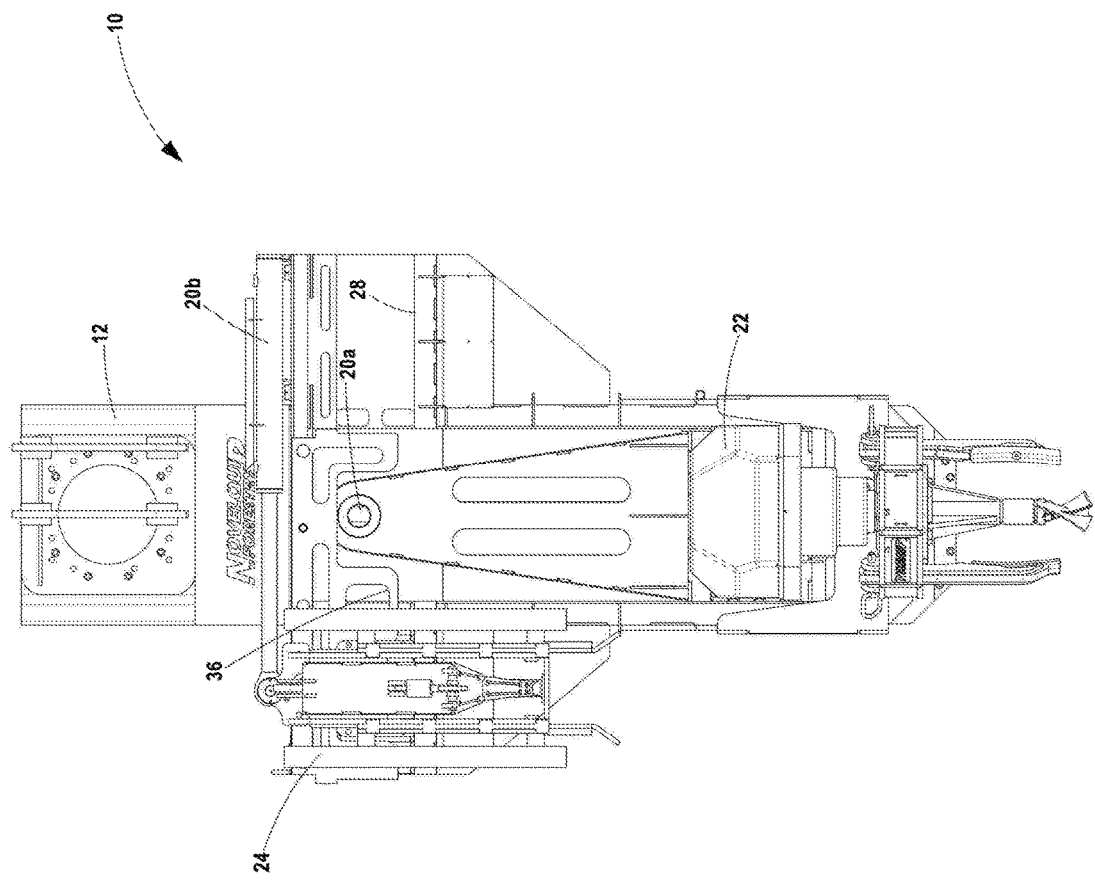
FIG. 4 is a front view of the planting apparatus in FIG. 3, with the first runner in an extended position.
Figure 6:
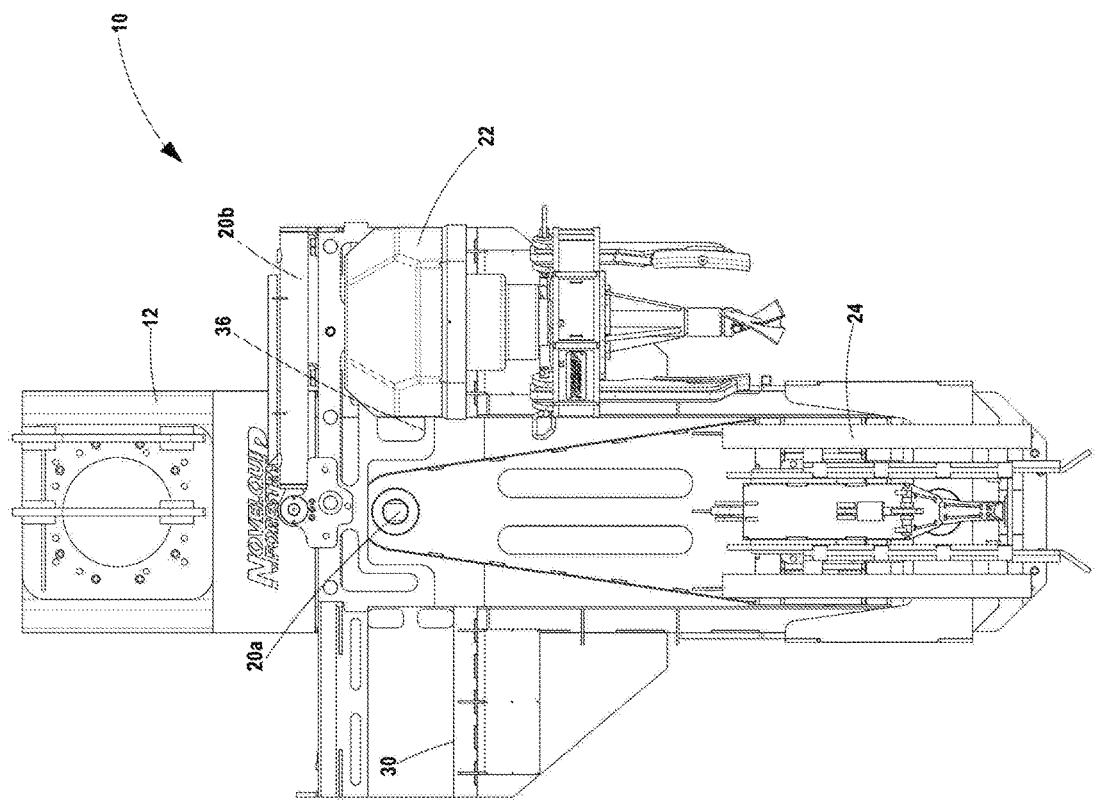
FIG. 6 is a front view of the planting apparatus in FIG. 5, with the first runner in an extended position.

Turning to FIGS. 4 and 6, when the first runner 14 is in the extended position, either the subsoiling head 22 or the planting head 24 carried on the first runner 14 protrudes from the housing 12.

The planting apparatus 10 further includes locking means, in this instance, in the form of the link 36 that:
prevents movement of the second runner 16 beyond the open axial end of the first branch guide 28 when: the third runner 18 is received on the first runner 14; and the first runner 14 is spaced along the primary guide from the retracted position (i.e. moved from the retracted position towards the extended position); and prevents movement of the third runner 18 beyond the open axial end of the second branch guide 30 when: the second runner 16 is received on the first runner 14; and the first runner 14 is spaced along the primary guide from the retracted position (i.e. moved from the retracted position towards the extended position).

In use:

The planting apparatus 10 (with the first runner 14 in the retracted position, the subsoiling head 22 supported via the second runner 16 on the first runner 14, and the planting head 24 captured via the third runner 18 in the second branch guide 30) is driven (via a tractor or other vehicle (not shown)) to a site where seedlings (not shown) are to be planted.

The planting apparatus 10 is positioned above the ground with the primary guide 26 extending substantially vertically when the tractor (or other vehicle) reaches the desired planting position.

The first actuator 20a slidably moves the first runner 14 (with second runner 16 and subsoiling head 22 supported thereon) along the primary guide 26 towards the extended position. With the first runner 14 in the extended position, the subsoiling head 22 protrudes from the housing 12.

The subsoiling head 22 is operated to prepare the soil, e.g. bore a pit in the ground, scarify the ground or form the ground into a mound.

The first actuator 20a slidably moves the first runner 14 (with second runner 16 and subsoiling head 22 supported thereon) along the primary guide 26 to the retracted condition.

The second actuator 20b (via the link 36) moves: the subsoiling head 22 from the first runner 14 into the first branch guide 28; and the planting head 24 from the second branch guide 30 on to the first runner 14.

The first actuator slidably moves the first runner 14 (with third runner 18 and planting head 24 supported thereon) along the primary guide 26 towards the extended position. With the first runner 14 in the extended position, the planting head 24 protrudes from the housing 12.

The planting head 24 is operated to plant a seedling in the soil prepared by the subsoiling head 22.

The first actuator 20a slidably moves the first runner 14 (with third runner 18 and planting head 24 supported thereon) along the primary guide 26 to the retracted condition.

The second actuator 20b (via the link 36) moves: the planting head 24 from the first runner 14 into the second branch guide 30; and the subsoiling head 22 from the first branch guide 28 on to the first runner 14.

The vehicle drives the planting apparatus 10 forward and repeats the steps described above.

Although the planting apparatus 10 has been described as effecting preparation of soil and planting of seedlings when the first runner is in the extended position, it will be appreciated that soil preparation and planting may be effected while the first runner 14 moves towards the extended position, thereby varying: displacement of the second and third runners 16 and 18 along the primary guide 26/protrusion of the heads 22 and 24 from the housing 12 and the depth of boring/planting.

Figure 8:
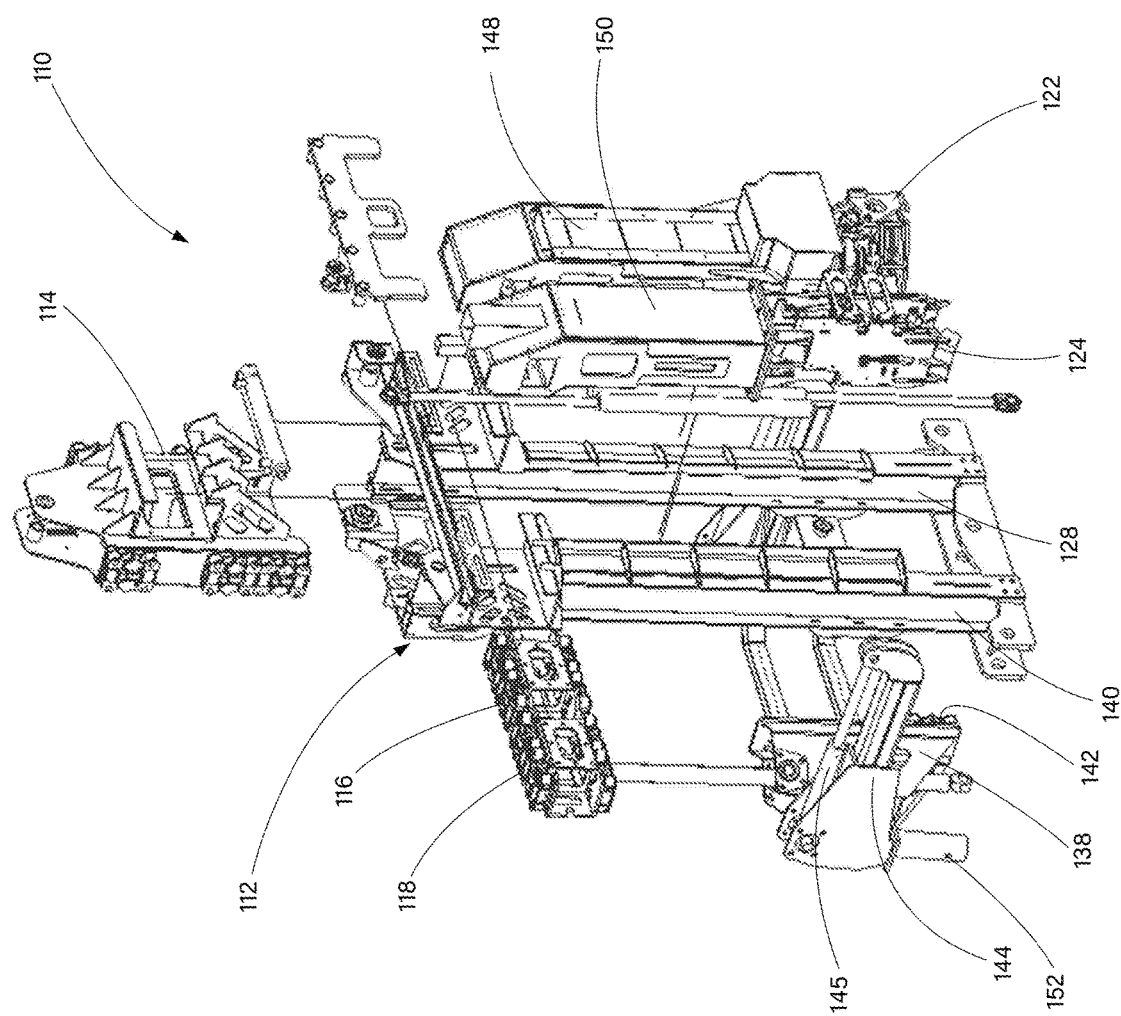
FIG. 8 is a perspective exploded view of planting apparatus according to an alternative embodiment of the invention.
Figure 9:
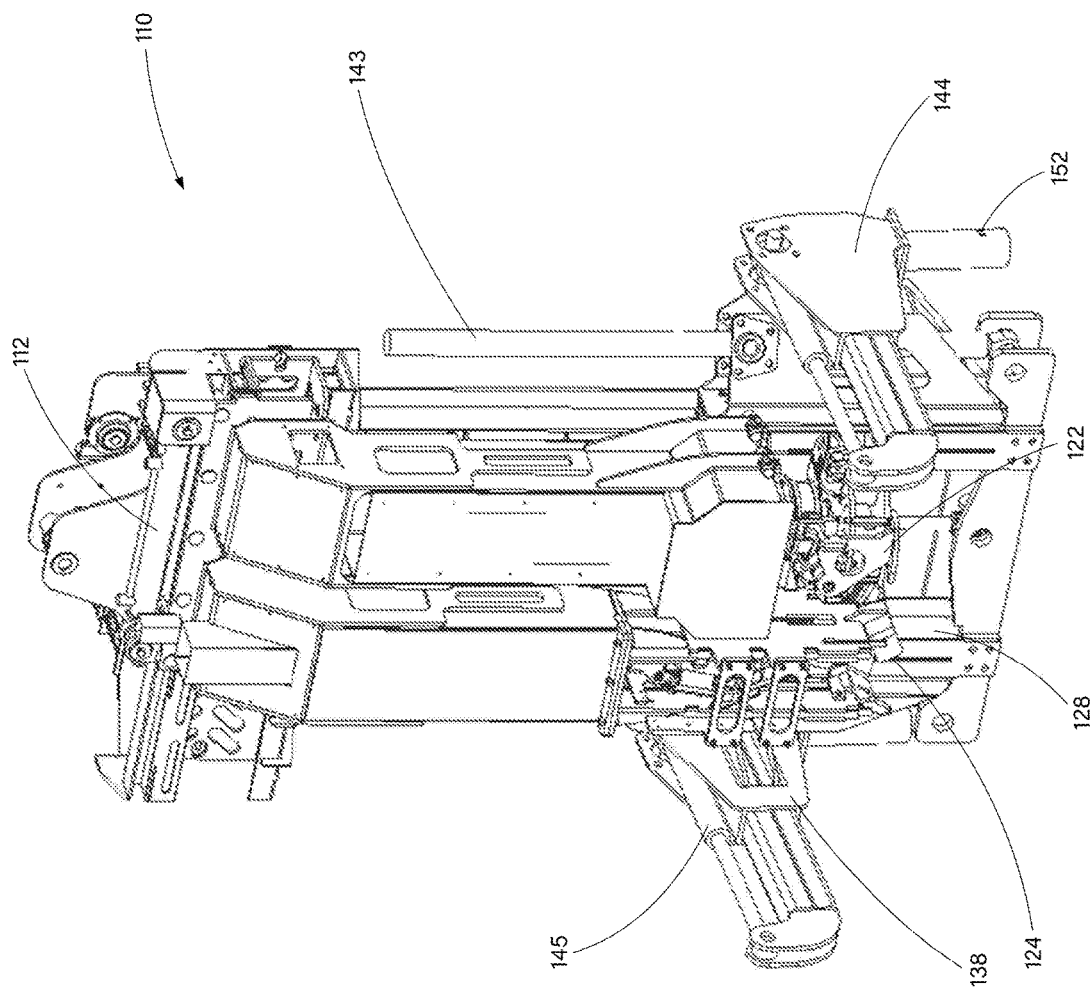
FIG. 9 is a perspective view of the planting apparatus in FIG. 8 secured to a vehicle.

FIGS. 8 and 9 show a planting apparatus 110 according to an alternative embodiment of the invention. This embodiment is generally similar to the planting apparatus 10 according to the preferred embodiment of the invention, provided that:

the U-shaped channel defined by the primary guide 128 along which the first runner 114, in use, travels is defined by one side of an I-beam (i.e. half of each of the I-beam flanges and the I-beam web);

the planting apparatus 110 further includes an elevator 138 that comprises: a track 140; a carriage 142 secured to and slidable along the track 140; and a third actuator 143 for moving the carriage 142 along the track 140. The housing 112 is secured to the track 140 such that the elevator 138 may, in use, raise and lower the housing 112. Alternatively, the carriage 142 may be secured to the housing 112 and the track 140 is securable to a vehicle (not shown).

the planting apparatus 110 further includes a retractor 144 with fourth actuator 145 that is disposed between vehicle (not shown, which is connected to the planting apparatus via stubs 152) and the elevator 138. In use, the retractor 144 moves the elevator 138 (with housing 112) laterally relative to the vehicle (i.e. extending the elevator 138 and housing 112 from and retracting the elevator 138 and housing 112 towards the side of the vehicle);

a first intermediate body 148 is disposed between the subsoiling head 122 and the second runner 116, thereby further to extend the subsoiling head 122 from the second runner 116; and a second intermediate body 150 is disposed between the planting head 124 and the third runner 118, thereby further to extend the planting head 124 from the third runner 118.

It will be appreciated that by swapping between the subsoiling head 22 and planting head 24 using linear movement of the heads 22 and 24 along the primary and branch guides 26, 28 and 30, the planting apparatus 10 requires less lateral clearance than the (approximately) 2 meter swing clearance required by prior art planting apparatus that rotatably swap between subsoiling and planting heads. By reducing the swing clearance required, the planting apparatus 10 according to the present invention is able to increase the density of planted seedlings per stop, and thereby increase production.

It will also be appreciated that swapping between the subsoiling head 22 and the planting head 24 is effected while maintaining the heads 22 and 24 secured to guides 26, 28 and 30 (whether directly or via the first runner 14) at all times. This significantly reduces the risk of either of the heads 22 or 24 breaking their connection with the housing 12 and falling.

Furthermore, it will be appreciated that the use of two actuators 20a and 20b increases control over linear movement of the heads 22 and 24: along the branch guides 28 and 30; onto the first runner 14; and along the primary guide 26.

The invention claimed is:

1. Planting apparatus including:
    a housing that defines:
        a primary guide; and
        first and second opposed branch guides extending laterally from the primary guide;
    a first runner slidably secured to, and movable along the primary guide;
    a rail on the first runner;
    a second runner securable to, and movable along the first branch guide;

a third runner securable to, and movable along the second branch guide;

the first, second and third runners being configured such that:
  the second runner is receivable from the first branch guide on to the rail of the first runner; and
  the third runner is receivable from the second branch guide on to the rail of the first runner; and drive means for moving:
  the second runner along the first branch guide and on to the rail of the first runner;
  the third runner along the second branch guide and on to the rail of the first runner; and
  the first runner, together with either of the second or third runners received thereon, along the primary guide.

2. The planting apparatus according to claim 1, wherein:
each of the primary guide, the first branch guide and the second branch guide is linear; and
the opposing first and second branch guides: are aligned with each other; and extend orthogonally from the primary guide.

3. The planting apparatus according to claim 2, wherein the rail of the first runner bridges the first and second branch guides when the first runner is in a retracted position and disposed on the primary guide, between the first and second branch guides.

4. The planting apparatus according to claim 3, wherein a subsoiling head is secured to the second runner, and a planting head is secured to the third runner.

5. The planting apparatus according to claim 4, wherein the drive means comprises:
  a first actuator for moving the first runner, together with either of the second or third runners received thereon, along the primary guide; and
  a second actuator for moving:
    the second runner along the first branch guide and on to the rail of the first runner; and
    the third runner along the second branch guide and on to the rail of the first runner.

6. The planting apparatus according to claim 5, wherein the first actuator and the second actuator extend and retract along parallel, spaced apart planes.

7. The planting apparatus according to claim 6, wherein the primary guide on the one hand and the first and second branch guides on the other hand extend along parallel, spaced apart planes.

8. The planting apparatus according to claim 7, wherein:
the first actuator is connected to the housing and extends to the first runner to move the first runner along the primary guide; and
the second actuator is connected to the housing and extends towards the second and third runners to move the second and third runners:
  along the first and second branch guides, respectively and on to the rail of the first runner; and
  from the rail of the first runner along the first and second branch guides, respectively.

9. The planting apparatus according to claim 8, further including locking means for:
  Preventing movement of the second runner along the first branch guide when: the third runner is received on the rail of the first runner; and the first runner is spaced along the primary guide from the retracted position; and
  preventing movement of the third runner along the second branch guide when: the second runner is received on the rail of the first runner; and the first runner is spaced along the primary guide from the retracted position.

10. The planting apparatus according to claim 9, wherein:
the locking means comprises a link plate that defines recesses for receiving the second and third runners therein; and
the second actuator is connected at: a first axial end of the second actuator to the housing; and a second axial end of the second actuator to the link plate.

11. The planting apparatus according to claim 10, wherein when the first runner is at an axial end of the primary guide, distal the first and second branch guides, either the subsoiling head or the planting head carried on the first runner protrudes from the housing.

12. The planting apparatus according to claim 11, further including an elevator comprising:
  a track;
  a carriage that is slidably secured to the track; and
  a third actuator for moving the carriage along the track,
wherein:
  the housing is secured to the track; and
  the carriage is securable to a vehicle,
in use, to raise and lower the housing relative to the vehicle.

13. The planting apparatus according to claim 12, further including a fourth actuator that is disposed between vehicle and the elevator, in use, to move the elevator laterally relative to the vehicle.

14. The planting apparatus according to claim 13, further including:
  a first intermediate body disposed between the subsoiling head and the second runner, thereby further to extend the subsoiling head from the second runner 116; and
  a second intermediate body disposed between the planting head and the third runner, thereby further to extend the planting head from the third runner.

15. The planting apparatus according to claim 11, further including an elevator comprising:
  a track;
  a carriage that is slidably secured to the track; and
  a third actuator for moving the carriage along the track,
wherein:
  the carriage is secured to the housing; and
  the track is securable to a vehicle,
in use, to raise and lower the housing relative to the vehicle.

* * * * *